CHARLES C. ROBERTS.

Improvement in Fruit Packing Implements.

No. 125,146. Patented April 2, 1872.

Witnesses.
J. H. Burridge
O. L. Humphrey

Inventor.
C. C. Roberts
Per Burridge & Co
Atty

UNITED STATES PATENT OFFICE.

CHARLES C. ROBERTS, OF PERRYSBURG, OHIO.

IMPROVEMENT IN FRUIT-PACKING IMPLEMENTS.

Specification forming part of Letters Patent No. 125,146, dated April 2, 1872.

*To all whom it may concern:*

Be it known that I, CHARLES C. ROBERTS, of Perrysburg, in the county of Wood and State of Ohio, have invented a certain new and Improved Device for Packing Grapes and other Fruits; and I do hereby declare the following is a full, clear, and complete description thereof, reference being had to the accompanying drawing making part of the same.

SPECIFICATION.

Figure 1:
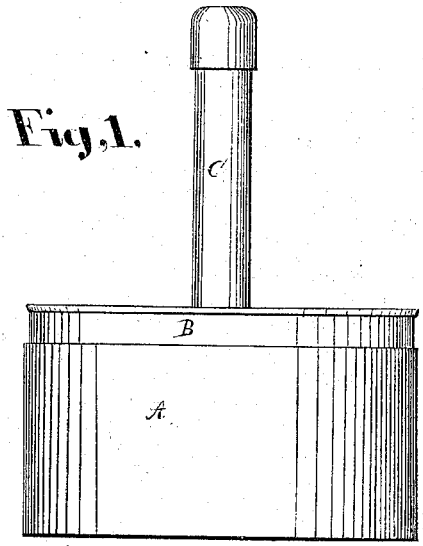
Figure 2:
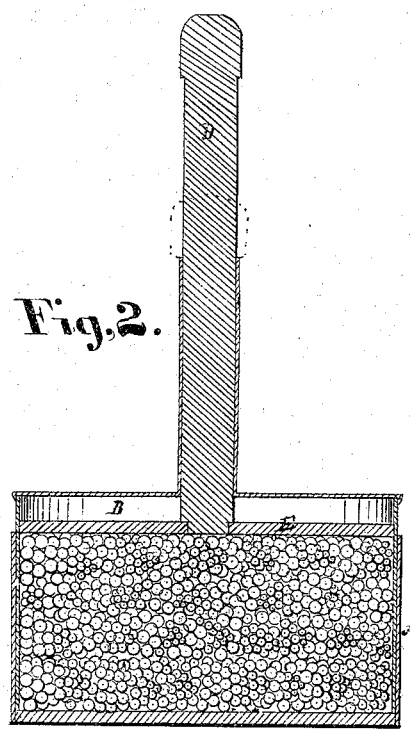
Figure 3:
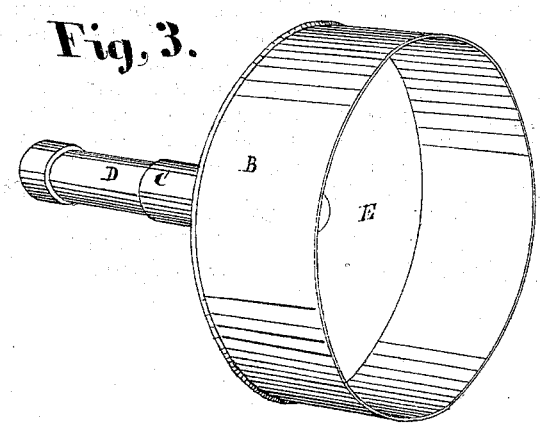

Figure 1 is a side view of the device referred to with the box. Fig. 2 is a vertical section. Fig. 3 is a perspective view.

Like letters of reference refer to like parts in the several views.

This invention is a device for packing small fruits, as grapes, &c., in boxes; and the object thereof is to pack said fruit so that it shall be close and uniform in the box when packed therein without being in any way torn or bruised. By this device the work of packing is also greatly facilitated. Said device consists of a case provided with a central tube, in which case is fitted a follower, having a handle projecting into and through said tube, all of which is constructed and operated as follows:

In the drawing, Fig. 1, A represents the box, in which the fruit is to be packed, and which has a holding capacity of a certain number of pounds. In said box is closely, but not tightly fitted, a metal case, B, as shown in Fig. 2, in which it will be seen that the case has a holding capacity about that of the box, a detached view of which case is shown in Fig. 3. Projecting upward from the top of the case is a tubular standard, C, wherein is fitted loosely the handle D of the follower E, fitted to the inside of the case, as shown in Fig. 2.

The practical operation of this packing device is as follows: The fruit to be packed in the box is first closely and properly packed in the case upon the follower, the case being inverted for the admission of the fruit. This being done, the box is then put on over the case, which is then placed upright upon the table, as shown in Fig. 1. The relative position of the box, case, follower, and handle is shown in Fig. 2, in which it will be seen that the follower is now at the top of the fruit, which fruit rests upon the bottom of the box. In order to withdraw the case and leave the fruit in the box, the operator places one hand upon the top of the handle, and with the other grasps the tube, whereby he draws upward and out from the box the case, the fruit being held down in the box by means of the follower.

By the use of this device, fruit can be packed closer and firmer in the box, and arranged therein so as to have the stems all hidden from sight at the top of the box more completely than it can be in the ordinary way; also, the packing can be done faster and with less injury to the fruit by chafing, by being first packed in the case, as the sides are smoother than those of the box, and, hence, less liable to tear the fruit.

*Claim.*

What I claim as my invention, and desire to secure by Letters Patent, is—

The case B, tubular standard C, follower E, and handle D, constructed and arranged to operate in relation to and in combination with the box A, in the manner and for the purpose specified.

CHARLES C. ROBERTS.

Witnesses:
J. H. BURRIDGE,
D. L. HUMPHREY.